United States Patent
Nguyen Canh et al.

(10) Patent No.: US 12,243,279 B2
(45) Date of Patent: Mar. 4, 2025

(54) METHOD AND APPARATUS FOR ADAPTIVE QUANTIZATION FOR SYMMETRY MESH

(71) Applicant: TENCENT AMERICA LLC, Palo Alto, CA (US)

(72) Inventors: Thuong Nguyen Canh, San Benito, CA (US); Xiaozhong Xu, State College, PA (US); Shan Liu, San Jose, CA (US); Fang-Yi Chao, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 27 days.

(21) Appl. No.: 18/471,803

(22) Filed: Sep. 21, 2023

(65) Prior Publication Data

US 2024/0153149 A1 May 9, 2024

Related U.S. Application Data

(60) Provisional application No. 63/418,394, filed on Oct. 21, 2022.

(51) Int. Cl.
| | | |
|---|---|---|
| G06T 9/00 | (2006.01) | |
| H04N 19/117 | (2014.01) | |
| H04N 19/124 | (2014.01) | |
| H04N 19/136 | (2014.01) | |
| H04N 19/61 | (2014.01) | |

(52) U.S. Cl.
CPC ........... *G06T 9/001* (2013.01); *H04N 19/117* (2014.11); *H04N 19/124* (2014.11); *H04N 19/136* (2014.11); *H04N 19/61* (2014.11)

(58) Field of Classification Search
CPC ...................................................... G06T 9/001
See application file for complete search history.

(56) References Cited

U.S. PATENT DOCUMENTS

| | | |
|---|---|---|
| 2018/0012400 A1 | 1/2018 | Evans |
| 2021/0029187 A1 | 1/2021 | Oh |
| 2022/0270319 A1 | 8/2022 | Doyle et al. |

OTHER PUBLICATIONS

Khaled Mammou et al., "[V-CG] Apple's Dynamic Mesh Coding CfP Response", International Organisation for Standardisation Organisation Internationale de Normalisation ISO/IEC JTC 1/SC 29/WG 7 Coding of Moving Pictures and Audio, ISO/IEC JTC 1/SC 29/WG 7 m59281, Online—Apr. 2022, 24 pages.
International Search Report dated Jan. 3, 2024, issued in International Application No. PCT/US23/33688.
Written Opinion dated Jan. 3, 2024, issued in International Application No. PCT/US23/33688.

*Primary Examiner* — Young Lee
(74) *Attorney, Agent, or Firm* — Sughrue Mion, PLLC

(57) ABSTRACT

A method performed by at least one processor of an encoder comprises: performing, on an input 3D mesh, a symmetry detection process to estimate a partition plane. The method further comprises partitioning the input 3D mesh into a first side and a second side based on the partition plane, where the first side is opposite to the second side, and where a first vertex on the first side is symmetric to a second vertex on the second side. The method further comprises quantizing the first vertex and the second vertex in pairs to reduce a quantization error and symmetry prediction error associated with the first vertex and the second vertex.

20 Claims, 9 Drawing Sheets

METHOD AND APPARATUS FOR ADAPTIVE QUANTIZATION FOR SYMMETRY MESH

CROSS-REFERENCE TO RELATED APPLICATION

This application claims priority from U.S. Provisional Application No. 63/418,394 filed on Oct. 21, 2022, the disclosure of which is incorporated herein by reference in its entirety.

FIELD

This disclosure is directed to a set of advanced video coding technologies. More specifically, the present disclosure is directed to adaptive quantization for symmetry mesh.

BACKGROUND

VMesh is an ongoing MPEG standard to compress meshes. The current VMesh reference software compresses meshes based on decimated base meshes, displacements vectors, and motion fields. The displacements are calculated by searching the closest point on the input mesh with respect to each vertex of the subdivided based mesh. The displacement vectors are transformed into wavelet coefficients by a linear lifting scheme, and then the coefficients are quantized and coded by a video codec or an arithmetic codec.

Reflection symmetry is a popular characteristic of mesh encoding, especially computer generated meshes. Symmetry may be utilized to compress symmetry mesh. Vertices are divided into a left and a right part of a symmetry plane. The left part is encoded by mesh coding while the right part is encoded by a symmetry prediction and displacement coding. Unfortunately, quantization error may significantly impact and degrade these symmetry properties. Conventional quantization creates an error for symmetry estimation. For example, a pair of symmetric vertices may no longer be symmetric after quantization. Furthermore, conventional quantization fails to utilize quantization for a remaining half symmetry mesh.

SUMMARY

According to one or more embodiments, a method performed by at least one processor of an encoder comprises performing, on an input 3D mesh, a symmetry detection process to estimate a partition plane. The method further comprises partitioning the input 3D mesh into a first side and a second side based on the partition plane, wherein the first side is opposite to the second side, wherein a first vertex on the first side is symmetric to a second vertex on the second side. The method further comprises quantizing the first vertex and the second vertex in pairs to reduce a quantization error and symmetry prediction error associated with the first vertex and the second vertex.

According to one or more embodiments, a encoder comprises at least one memory configured to store program code, and at least one processor configured to read the program code and operate as instructed by the program code. The program code includes performing code configured to cause the at least one processor to perform, on an input 3D mesh, a symmetry detection process to estimate a partition plane. The program code further includes partitioning code configured to cause the at least one processor to partition the input 3D mesh into a first side and a second side based on the partition plane, where the first side is opposite to the second side, and where a first vertex on the first side is symmetric to a second vertex on the second side. The program code further includes quantizing code configured to cause the at least one processor to quantize the first vertex and the second vertex in pairs to reduce a quantization error and symmetry prediction error associated with the first vertex and the second vertex.

According to one or more embodiments, a non-transitory computer readable medium having instructions stored therein, which when executed by a processor in an encoder cause the processor to execute a method comprising performing, on an input 3D mesh, a symmetry detection process to estimate a partition plane. The method further comprises partitioning the input 3D mesh into a first side and a second side based on the partition plane, where the first side is opposite to the second side, and where a first vertex on the first side is symmetric to a second vertex on the second side. The method further comprises quantizing the first vertex and the second vertex in pairs to reduce a quantization error and symmetry prediction error associated with the first vertex and the second vertex.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
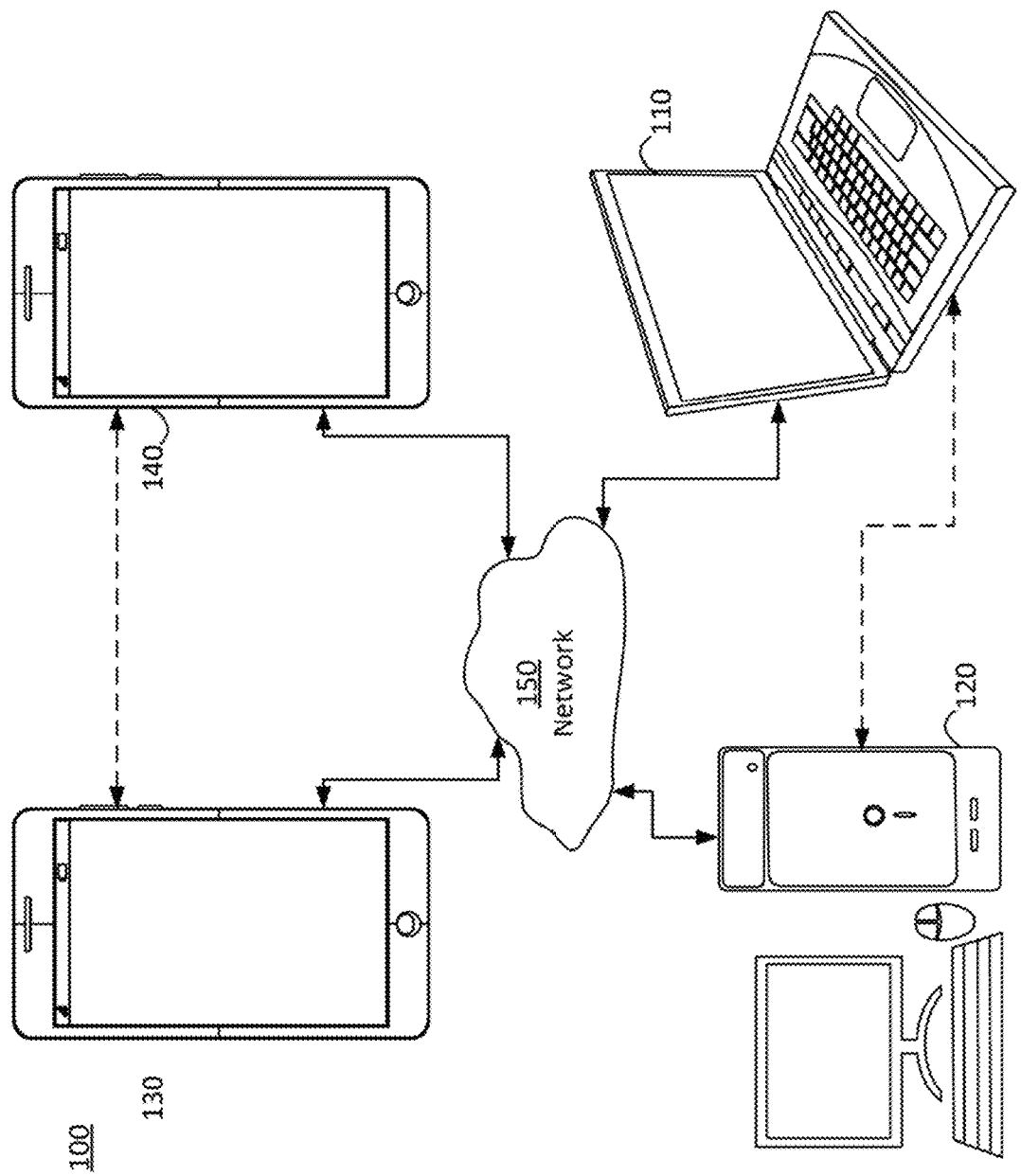
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
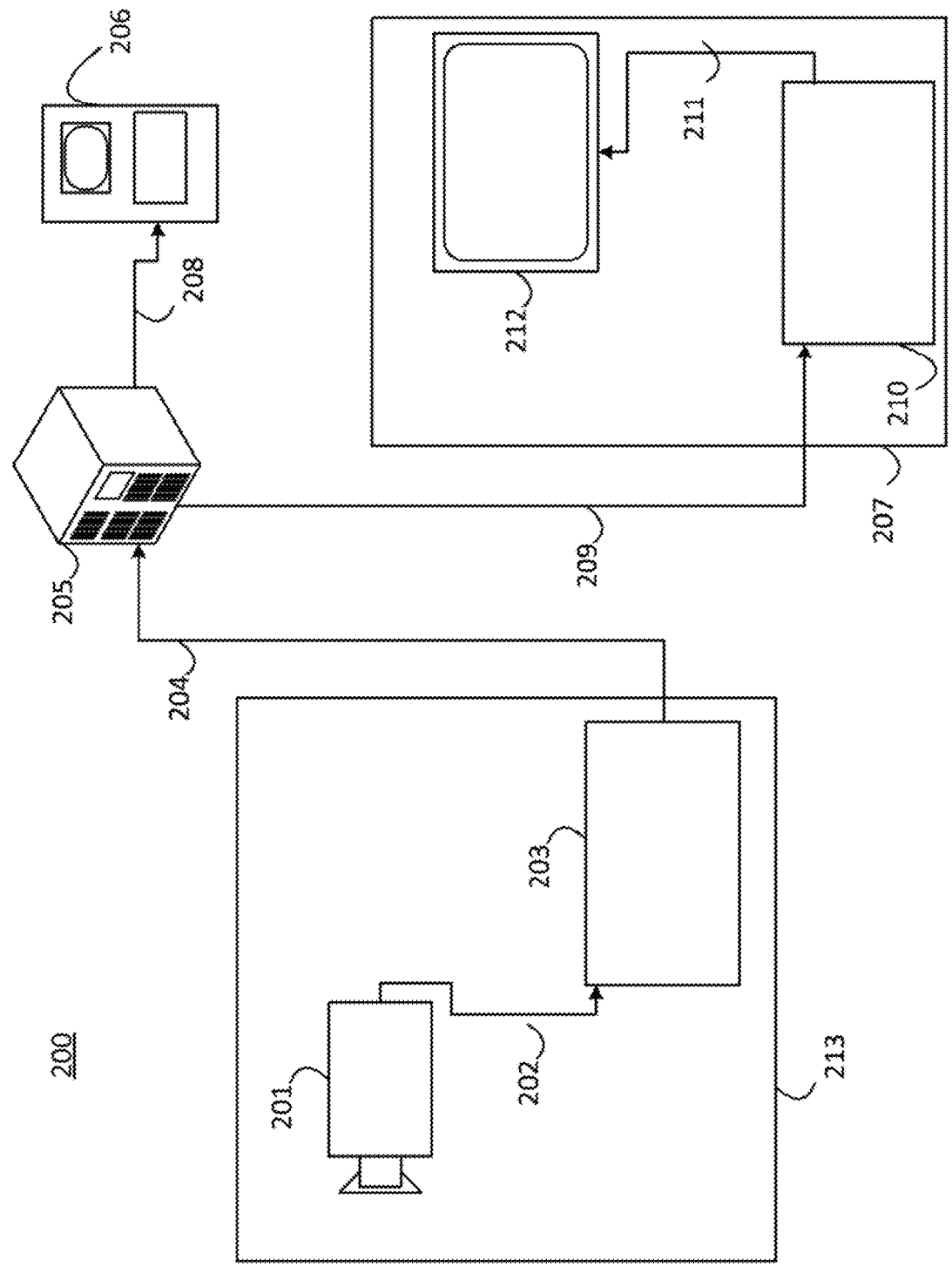
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

A mesh may be a collection of vertices, edges, and faces that define a shape or an object. A 3D mesh may include a plurality of vertices, with each vertex associated with a 3D coordinate in a 3D space (e.g., x, y, z). A 2D mesh may include a plurality of vertices with each vertex associated a 2D coordinate in a 2D space (e.g., x and y). The vertices may be connected to form edges, where a collection of vertices may define a face.

Figure 3:
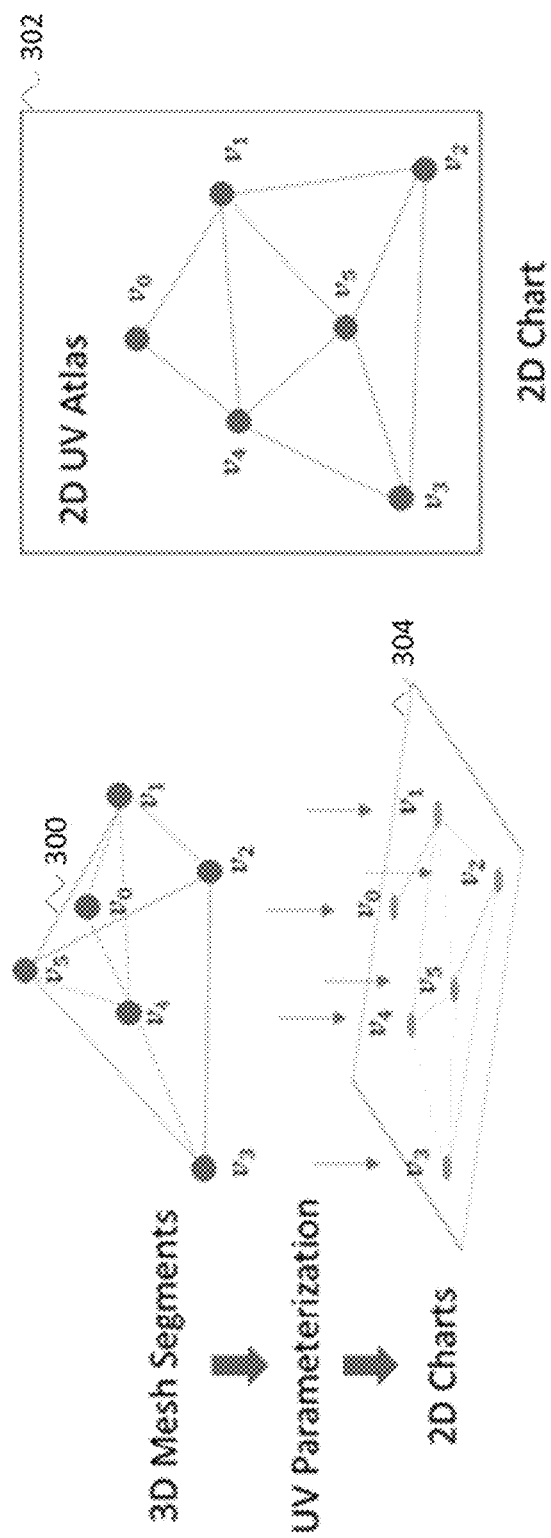
FIG. 3 illustrates an example of UV parameterization mapping from 3D mesh segments onto 2D charts, in accordance with embodiments of the present disclosure.

According to one or more embodiments, a 3D mesh may be partitioned into several segments (or patches/charts). Each segment may be composed of a set of connected vertices associated with their geometry, attribute, and connectivity information. As illustrated in FIG. 3, a UV parameterization process maps a mesh segment 300 onto a 2D chart in the 2D UV atlas (302, 304). Each vertex in the mesh segment may be assigned with a 2D UV coordinates in the 2D UV atlas. The vertices in a 2D chart may form a connected component as their 3D counterpart. The geometry and connectivity information of each vertex may be inherited from their 3D counterpart as well. Therefore, the UV coordinates map vertices in a 2D space to the 3D space based on associated UV attributes that include geometry and connectivity information.

Figure 4:
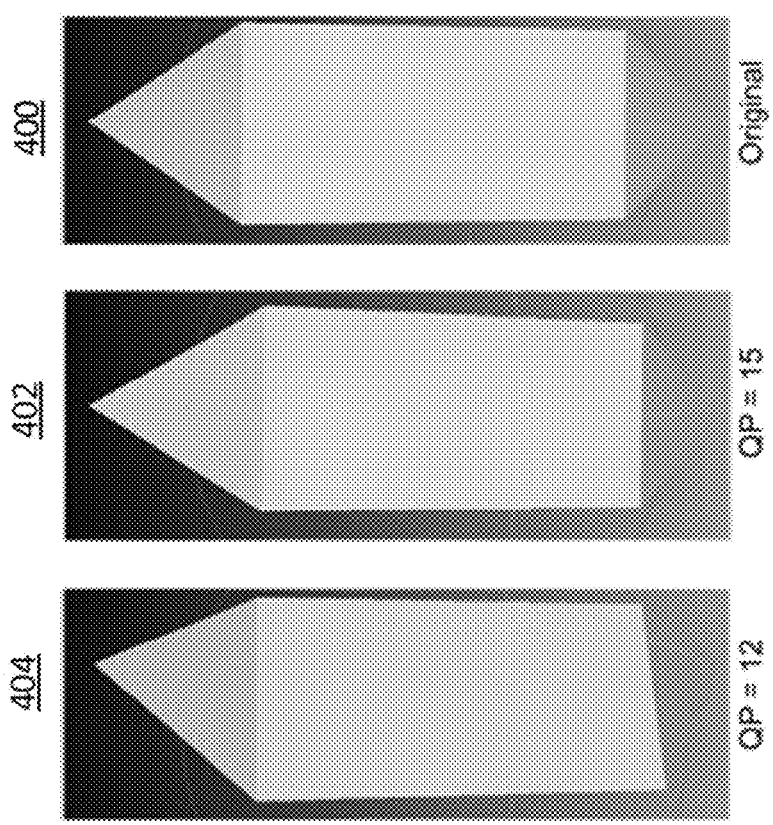
FIG. 4 illustrates an example of distortion to a symmetry mesh caused by quantization, in accordance with embodiments of the present disclosure.

Embodiments of the present disclosure are directed to adaptive quantization for a symmetry mesh. Quantization is known to introduce distortion, thereby creating error in symmetry estimation. For example, FIG. 4 illustrates an original mesh object 400 and resulting reconstructed objects 402 and 404. The reconstructed object 402 is quantized with a bitdepth 15, and the reconstructed object 404 is quantized with bitdepth 12. Although both reconstructed objects 402 and 404 exhibit distortion, particularly symmetric distortion, reconstructed object 402 has less distortion than reconstructed object 404.

The embodiments of the present disclosure may be used separately or combined in any order and may be used for arbitrary surface symmetry mesh polygon meshes. In one or more examples, surface symmetry mesh may be defined as a mesh that has a symmetrical surface, but not necessarily have one-to-one symmetry between a left side and a right side of a given symmetry plane. That is, the right vertices may be predicted from the left vertices via a symmetry plane with a small displacement. The embodiments of the present disclosure are directed to quantizing a symmetry mesh, particularly a pair of symmetric vertices in the mesh, that preserve symmetry. In one or more examples, two vertices that are symmetric to each other have a same distance from a partition plane along a same axis. For example, in a UV space, a first vertex with UV coordinate (5, 5) is symmetric to a second vertex with UV coordinate (−5, 5), or a third vertex (5, −5), or a fourth vertex (−5, −5).

Figure 5:
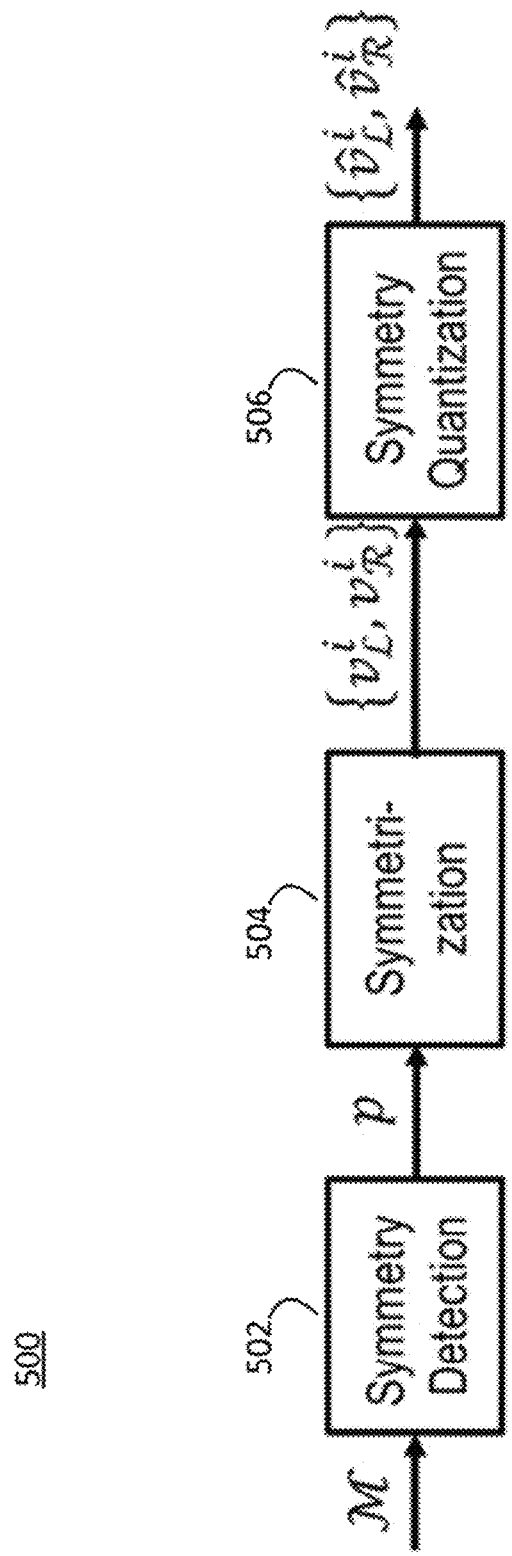
FIG. 5 illustrates an example framework for performing symmetry quantization of vertices in a 3D mesh, in accordance with embodiments of the present disclosure.

FIG. 5 illustrates an example framework 500 for performing symmetry quantization of vertices in a 3D mesh, in accordance with embodiments of the present disclosure. Particularly, FIG. 5 illustrates an example framework for adaptive symmetry quantization. As illustrated in FIG. 5, a symmetry detection process 502 may be performed on an input mesh $\mathcal{M}$ to estimate a symmetry plane p. In one or more examples, the input mesh $\mathcal{M}$ is a 3D mesh.

Based on the symmetry plane p, a symmetrization process 504 may be performed to classify vertices of the input mesh $\mathcal{M}$ as left, right, and in-plane vertices as $\mathcal{V}_L$, $\mathcal{V}_R$, $\mathcal{V}_J$, respectively. In one or more examples, since one-to-one mapping is not required for surface symmetry, the size of left and right vertices set is not required to be the same. Therefore, in one or more examples, the symmetrization process 504 may be performed to generate a symmetrized mesh with m vertices in which one-to-one mapping between left $v_L^i$ and right $v_R^i$ vertices is satisfied. After the symmetrization process 504, a symmetry quantization process 506 may be performed to preserve the symmetry properties. The vertices $\hat{v}_L^i$, $\hat{v}_R^i$ may be referred to as quantized vertices of vertices $v_L^i$, $v_R^i$, respectively.

According to one or more embodiments, the symmetry quantization process 506 implements a quantization method to preserve symmetry. In one or more examples, for each symmetry pair $\{v_L^i, v_R^i\}$ $\forall i \in [0,m]$, the right vertex is predicted from the left vertex via a given symmetry plane p as follows.

$$\tilde{v}_R^i = \text{SymPred}(v_L^i, p) \qquad \text{Eq. (1)}$$

In one or more examples, an associated error for the i-th symmetry pair of vertices may be calculated as follows.

$$\text{sym\_err}_i = |v_R^i - \tilde{v}_R^i|_2^2, \qquad \text{Eq. (2)}$$

where |·| stand for norm operation.

In one or more examples, for quantization, a uniform quantization may be performed as follows.

$$\hat{v}_L^i = \left\lfloor \frac{v_L^i}{\Delta Q} + \theta \right\rfloor, \qquad \text{Eq. (3)}$$

where the quantization offset θ=0.5, and ΔQ is the quantization step-size.

In one or more example, the corresponding dequantized vertex may be derived as follows.

$$\bar{v}_L^i = \Delta Q * \hat{v}_R^i. \qquad \text{Eq. (4)}$$

In one or more examples, using symmetry prediction, the final distortion error may be calculated as follows:

$$Q(\hat{v}_L^i) = |v_L^i - \hat{v}_L^i \times \Delta Q|_2^2 + \alpha |\text{SymPred}(\hat{v}_L^i \times \Delta Q, p) - v_R^i|_2^2. \qquad \text{Eq. (5)}$$

In the final distortion error equation, the parameter α may be a scalar weighting factor. In one or more examples, α>0. This equation may be equivalent to a quantization error of the left plus symmetry prediction error. In one or more examples, the final distortion error equation is a function of quantized left vertices $\hat{v}_L^i$.

According to one or more embodiments, a search may be performed to find the best quantized vertex $\hat{v}_L^*$ from a search space $\mathcal{S}$ as follows.

$$\hat{v}_L^* = \min_{\hat{v}_L \in S} Q(\hat{v}_L). \qquad \text{Eq. (6)}$$

The best quantized vertex $\hat{v}_L^*$ may be the vertex that minimizes the final distortion error. In one or more examples, in a 3D mesh, as each vertex has three coordinates, a uniform quantization of left vertices may be denoted as $\{\hat{x}_L, \hat{y}_L, \hat{z}_L\}$. The search space for the 3D mesh may be specified as follows.

$$\mathcal{S} = \{\hat{x}_{\mathcal{L}} \pm \Delta_x, \hat{y}_{\mathcal{L}} \pm \Delta_y, \hat{z}_{\mathcal{L}} \pm \Delta_z\}, \Delta_{x,y,z} \in [0, \ldots, K], \qquad \text{Eq. (7)}$$

with K is the maximum offset for the quantized values.

Accordingly based on this equation, the search space $\mathcal{S}$ is incrementally searched in the x, y, and z directions to find the best quantized vertex $\hat{v}_{\mathcal{L}}^*$ that minimizes distortion. Once the best quantized vertex $\hat{v}_{\mathcal{L}}^*$ is found, the corresponding pair $\hat{v}_{\mathcal{L}}^*$, $\hat{v}_{\mathcal{R}}^*$ is determined based on symmetry prediction.

In one or more examples, K is selected as 1, and weighting factor $\alpha$=1.

Figure 6:
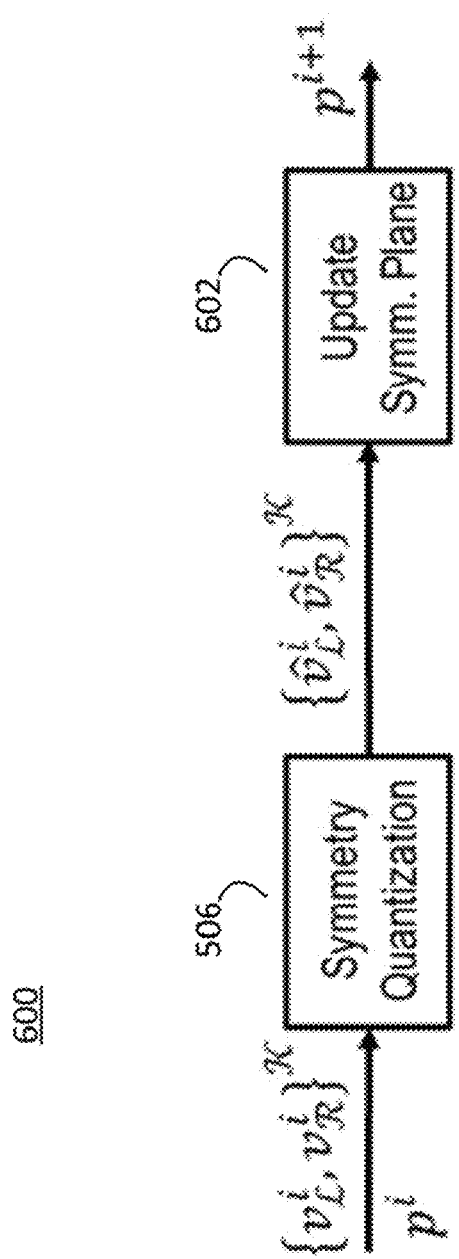
FIG. 6 illustrates an example framework for performing adaptive quantization with symmetry plane refinement, in accordance with embodiments of the present disclosure.

FIG. 6 illustrates an example framework 600 for performing adaptive quantization with symmetry plane refinement, in accordance with embodiments of the present disclosure. The framework 600 may perform an iterative symmetry quantization refinement on plane p. In one or more examples, symmetry pairs are divided into multiple subgroups resulting in $\mathcal{K}$ symmetry pairs. In one or more examples, each subgroup is formed randomly. In one or more examples, each subgroup is formed based on an order of symmetry prediction error. For example, pairs with the highest symmetry prediction error may be grouped together, or pairs with the lowest symmetry prediction error may be group together.

In one or more examples, the symmetry quantization process 506 may be performed for each subgroup with a current symmetry plane $p^i$. After the symmetry quantization process 506 is performed, an update symmetry plane process 602 may be performed to refine plane $p^i$ based on the quantized vertices to reduce the symmetry prediction error. In one or more examples, processes 506 and 602 are iteratively performed for plane $p^i$ until a change in this plane is less than a threshold (e.g., small change observed).

Figure 7:
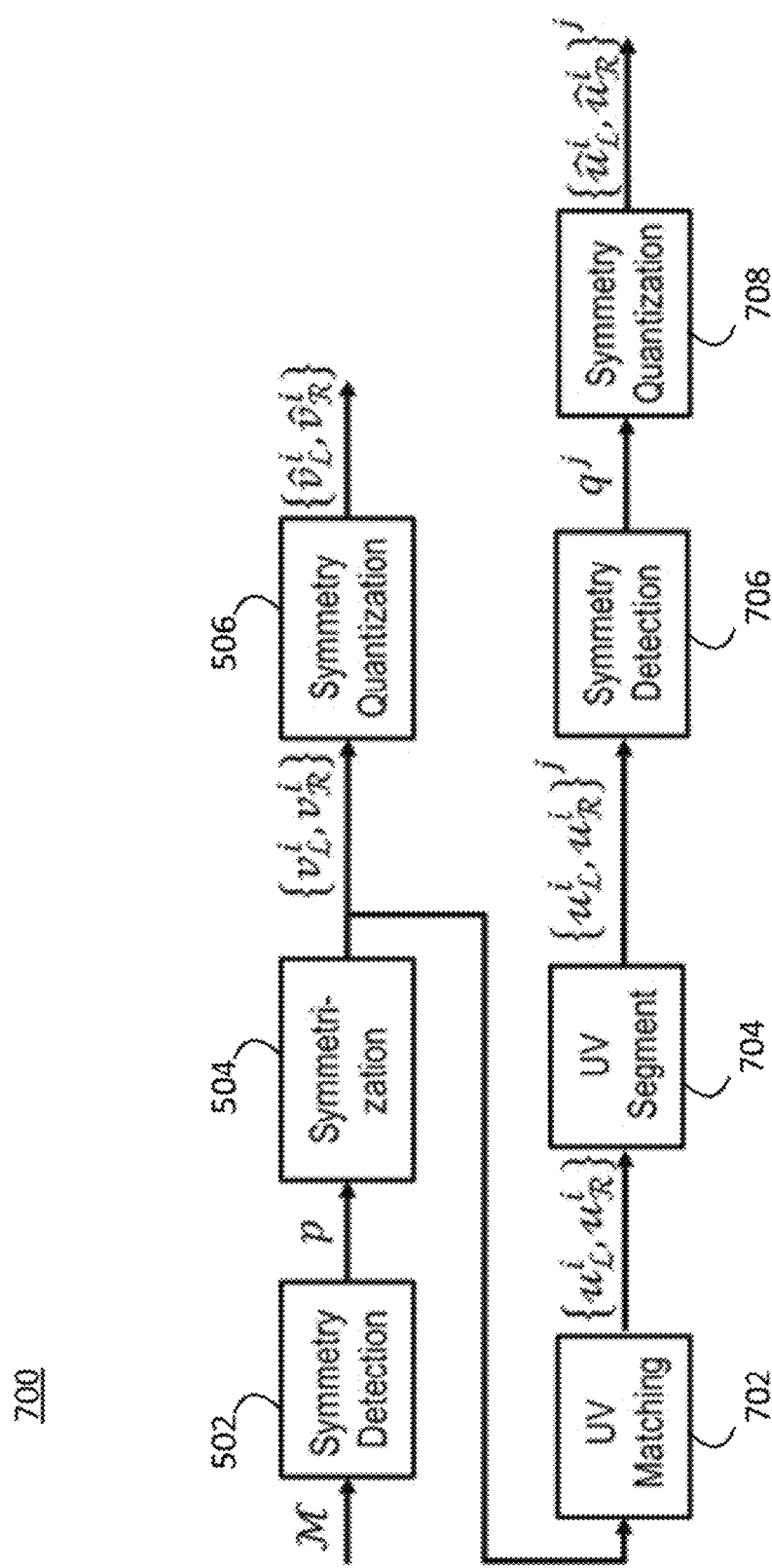
FIG. 7 illustrates an example framework for performing adaptive quantization for a 2D mesh, in accordance with embodiments of the present disclosure.

FIG. 7 illustrates an example framework 700 for performing adaptive quantization for a 2D mesh, in accordance with embodiments of the present disclosure. In FIG. 7, the symmetry detection process 502, symmetrization process 504, and symmetry quantization process 506 may correspond to the symmetry detection process 502. symmetrization process 504, and symmetry quantization process 506, respectively, in FIG. 5.

The framework 700 may perform symmetry quantization for UV attributes. A UV matching process 702 may be performed on the output of the symmetrization process 502. The UV matching process 702 may find and estimate corresponding left and right UV pairs $\{u_{\mathcal{L}}^i, u_{\mathcal{R}}^i\}$ of the vertices pair $\{v_{\mathcal{L}}^i, v_{\mathcal{R}}^i\}$. For example, referring to FIG. 3, UV matching process 702 may generate UV pairs in a 2D mesh 304 that correspond to vertices in the 3D mesh 300.

A UV segmentation process 704 may be performed to segment a 2D mesh into $\mathcal{K}$ multiple non-connected symmetry parts. A symmetry detection process 706 may be performed for the j-th UV part to estimate a 2D transform $q^j$. A symmetry quantization process 708 may be performed to find quantized symmetry pair $\hat{u}_{\mathcal{L}}^i, \hat{u}_{\mathcal{R}}^i$.

In one or more examples, a distortion error to select quantization for j-th UV segment may be determined as follows.

$$\hat{u}_{\mathcal{L}}^{i,j}(Q) = |u_{\mathcal{L}}^i - \hat{u}_{\mathcal{L}}^i \times \Delta Q|_2^2 + \alpha_{uv}|\text{SymPred}^j(\hat{u}_{\mathcal{L}}^i \times \Delta Q, q^j) - u_{\mathcal{R}}^i|_2^2 \qquad \text{Eq. (8)}$$

where $\hat{u}_{\mathcal{L}}^i$ is the quantized UV of $u_{\mathcal{L}}^i$, weighting factor $\alpha_{uv}$>0, and symmetry prediction for j-the UV segment is SymPred$^j(\cdot)$ with symmetry parameter $q^j$.

The equation for $Q^j(\hat{u}_{\mathcal{L}}^i)$ may correspond to optimized quantization for both quantization error and symmetry prediction error for UV attributes. The best quantized left UV $\hat{u}_{\mathcal{L}}^*$ may be derived from search space $\mathcal{S}_{uv}$ as follows.

$$\hat{u}_{\mathcal{L}}^* = \min_{\hat{u}_{\mathcal{L}} \in S} Q(\hat{u}_{\mathcal{L}}) \qquad \text{Eq. (9)}$$

In contrast to point attributes for 3D coordinates, in UV attributes, the optimal search space for 2D coordinates may be defined as follows.

$$\mathcal{S}_{uv} = \{\hat{x}_{\mathcal{L}} \pm \Delta_x, \hat{y}_{\mathcal{L}} \pm \Delta_y\}, \Delta_{x,y} \in [0, \ldots, K_{uv}], \qquad \text{Eq. (10)}$$

with $K_{uv}$ is the maximum offset for the quantized values.

Accordingly, a 2D space may be searched to find the best 2D vertex $\hat{u}_{\mathcal{L}}^*$ that minimizes quantization distortion and symmetry prediction error. After the best 2D vertex $\hat{u}_{\mathcal{L}}^*$ is found, the correspond vertex $\hat{u}_{\mathcal{R}}^*$ may be derived based on symmetry prediction.

Figure 8:
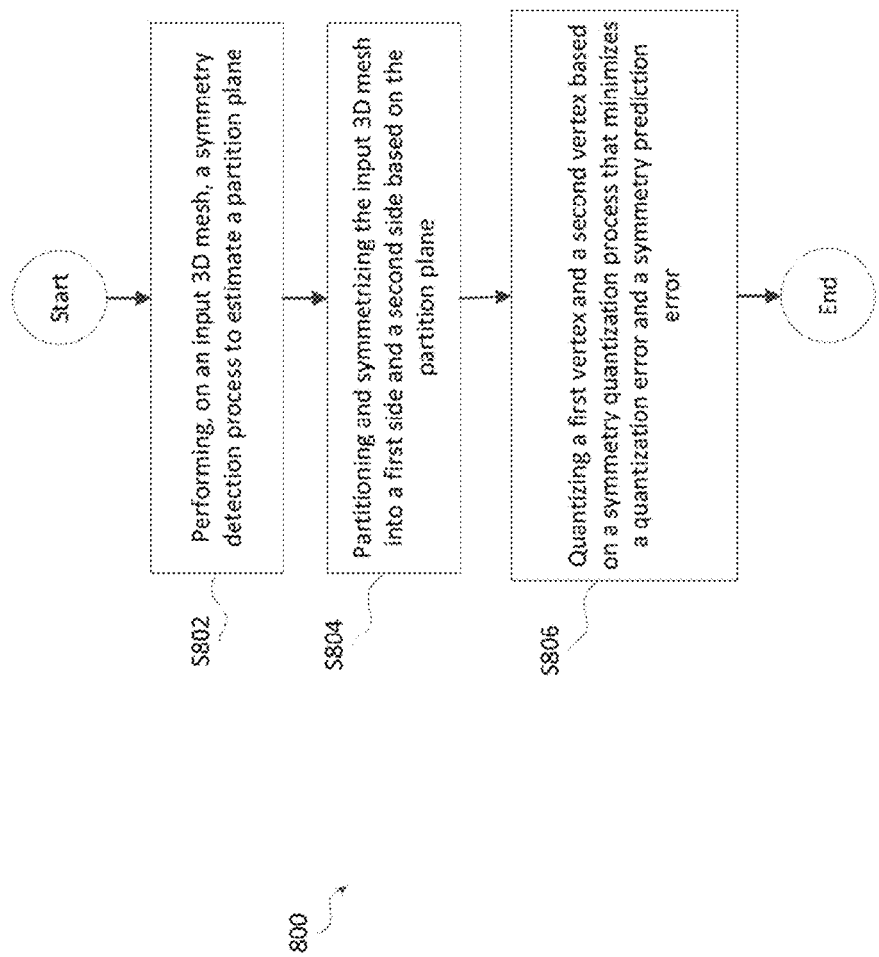
FIG. 8 illustrates a flowchart of an example embodiment for performing symmetry quantization, in accordance with embodiments of the present disclosure.

FIG. 8 illustrates a flowchart of an example process 800 for performing symmetry quantization in accordance with one or more embodiments of the present disclosure.

The process may start at operation S802 where a symmetry detection process may be performed on an input 3D mesh to estimate a partition plane. A partition plane may be a plane that partitions the 3D mesh into a first side (e.g., left side) and a second side (e.g., right side). For example, symmetry detection process 502 may be performed in input mesh $\mathcal{M}$ to estimate partition plane p.

The process proceeds to operation S804 where the input 3D mesh is partitioned and symmetrized into a first side and a second side based on the partition plane p. For example, the partition plane p may partition the input 3D mesh into a left side (e.g., first side) and a right side (e.g., second side), where vertices in the input 3D mesh are classified as being a left side vertex, a right side vertex, or an in-plane vertex.

The process proceeds to operation S806 where a first vertex and a second vertex are quantized based on a symmetry quantization process that minimizes a quantization error and symmetry prediction error. For example, the symmetry quantization process 506 may be performed on vertices $v_{\mathcal{L}}^i, v_{\mathcal{R}}^i$ to find the best quantized vertices $\hat{v}_{\mathcal{L}}^*, \hat{v}_{\mathcal{R}}^*$ that minimize distortion and symmetry prediction error.

The techniques, described above, may be implemented as computer software using computer-readable instructions and physically stored in one or more computer-readable media. For example, FIG. 9 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 9:
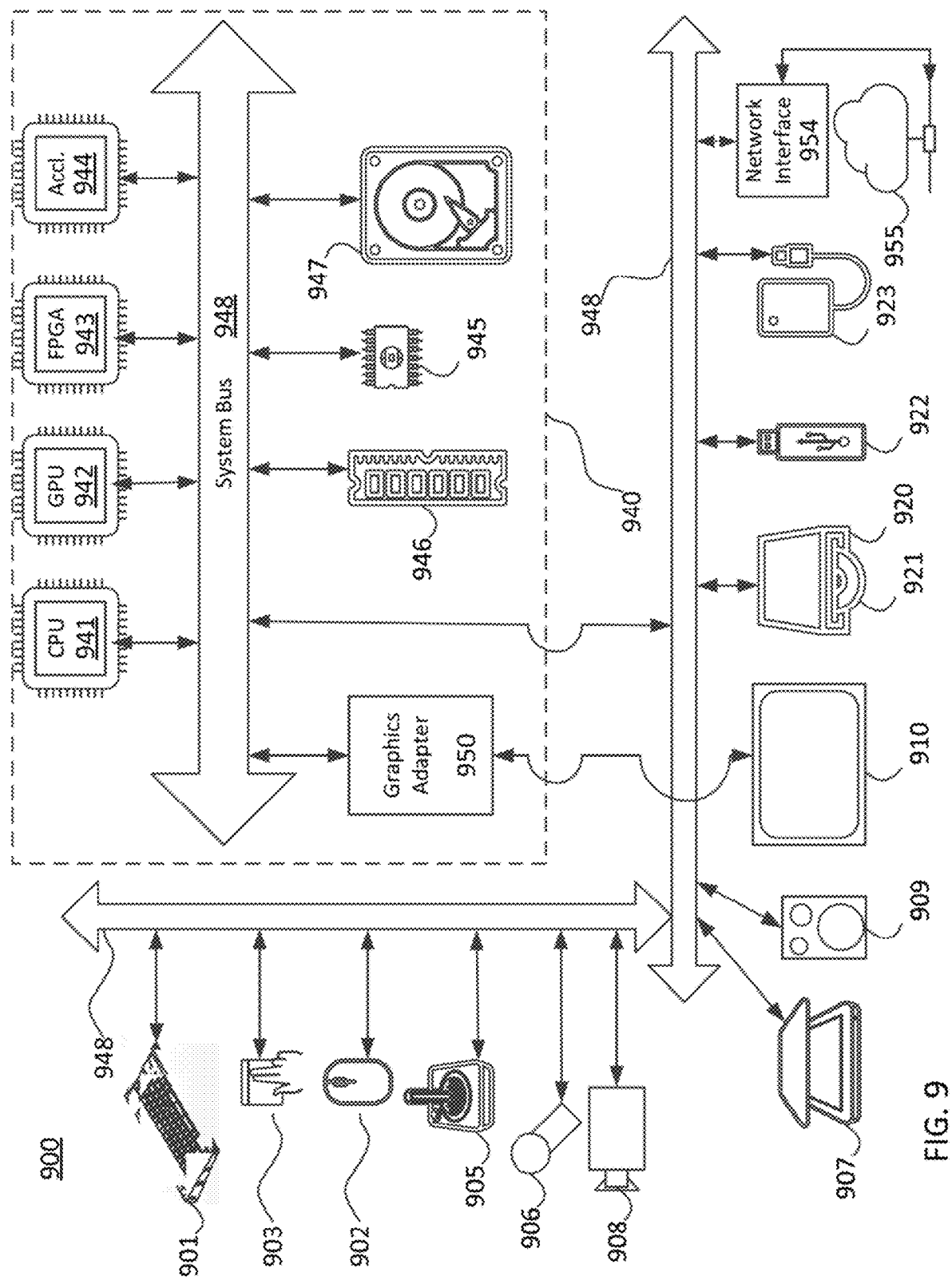
FIG. 9 is a diagram of a computer system suitable for implementing the embodiments of the present disclosure.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 900, and specifically the core 940 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (for example: accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method performed by at least one processor of an encoder, the method comprising: performing, on an input 3D mesh, a symmetry detection process to estimate a partition plane; partitioning the input 3D mesh into a first side and a second side based on the partition plane, in which the first side is opposite to the second side, in which a first vertex on the first side is symmetric to a second vertex on the second side; and quantizing the first vertex and the second vertex in pairs to reduce a quantization error and symmetry prediction error associated with the first vertex and the second vertex.

(2) The method according to feature (1), in which the quantization error is based on an error between the first vertex and a quantization of the first vertex.

(3) The method according to feature (2), in which the quantization error is further based on a difference between the second vertex and a quantization of the second vertex.

(4) The method according to feature (3), in which the quantization of the second vertex is determined based on a symmetry prediction performed on the quantized first vertex and the partition plane.

(5) The method according to any one of features (1)-(4), in which the quantizing further comprises performing a search in a 3D space around the quantized first vertex to find a best vertex on the first side and a best vertex on the second side that reduces the quantization error and the symmetry prediction error.

(6) The method according to any one of features (1)-(5), in which the quantizing is performed on K symmetry pairs based on the partition plane, and in which the partition plane is updated based on the quantizing performed on the K symmetry pairs.

(7) The method according to feature (6), in which the quantizing is performed on the K symmetry pairs and the updating of the partition plane is iteratively performed until a change in the partition plane between a first iteration and a second iteration is less than a threshold.

(8) The method according to any one of features (1)-(7), further comprising: determining, based on an a 2D matching process performed on the input 3D mesh that is partitioned, a 2D mesh; segmenting the 2D mesh into a plurality of non-connected segments; performing, for at least one non-connected segment in the plurality of non-connected segments, a symmetry detection process to determine a transform that partitions the at least one non-connected segment into a first side and a second side opposite to the first side, in which the first side includes a first 2D vertex and the second side include a second 2D vertex symmetric to the first 2D vertex; and quantizing the first 2D vertex and the second 2D vertex in pairs to reduce a quantization error associated with the first 2D vertex and a symmetry prediction error associated with the second 2D vertex.

(9) The method according to feature (8), in which the quantization error associated with the first 2D vertex is based on an error between the first 2D vertex and a quantization of the first 2D vertex.

(10) The method according to feature (9), in which the quantization error associated with the first 2D vertex is further based on a difference between the second 2D vertex and a quantization of the second 2D vertex.

(11) The method according to feature (10), in which the quantization of the second 2D vertex is determined based on a symmetry prediction performed on the quantized first 2D vertex and the transform.

(12) The method according to any one of features (8)-(11), in which the quantizing the first 2D vertex and the second 2D vertex further comprises performing a search in a 2D space around the quantized first 2D vertex to find a best vertex on the first side of the at least one non-connected segment and a best vertex on the second side of the at least one non-connected segment that reduces the quantization error and the symmetry prediction error.

(13) An encoder comprising: at least one memory configured to store program code; and at least one processor configured to read the program code and operate as instructed by the program code, the program code including: performing code configured to cause the at least one processor to perform, on an input 3D mesh, a symmetry detection process to estimate a partition plane, partitioning code configured to cause the at least one processor to partition the input 3D mesh into a first side and a second side based on the partition plane, in which the first side is opposite to the second side, in which a first vertex on the first side is symmetric to a second vertex on the second side; and quantizing code configured to cause the at least one processor to quantize the first vertex and the second vertex in pairs to reduce a quantization error and symmetry prediction error associated with the first vertex and the second vertex.

(14) The encoder according to feature (13) in which the quantization error is based on an error between the first vertex and a quantization of the first vertex.

(15) The encoder according to feature (14), in which the quantization error is further based on a difference between the second vertex and a quantization of the second vertex.

(16) The encoder according to feature (15), in which the quantization of the second vertex is determined based on a symmetry prediction performed on the quantized first vertex and the partition plane.

(17) The encoder according to any one of features (13)-(16), in which the quantizing further comprises performing a search in a 3D space around the quantized first vertex to find a best vertex on the first side and a best vertex on the second side that reduces the quantization error and the symmetry prediction error.

(18) The encoder according to any one of features (13)-(17), in which the quantizing is performed on K symmetry pairs based on the partition plane, and in which the partition plane is updated based on an output of the quantizing performed on the K symmetry pairs.

(19) The encoder according to feature (18), in which the quantizing performed on the K symmetry pairs and the updating of the partition plane is iteratively performed until a change in the partition plane between a first iteration and a second iteration is less than a threshold.

(20) A non-transitory computer readable medium having instructions stored therein, which when executed by a processor in an encoder cause the processor to execute a method comprising: performing, on an input 3D mesh, a symmetry detection process to estimate a partition plane; partitioning the input 3D mesh into a first side and a second side based on the partition plane, in which the first side is opposite to the second side, in which a first vertex on the first side is symmetric to a second vertex on the second side; and quantizing the first vertex and the second vertex in pairs that reduces a quantization error and symmetry prediction error associated with the first vertex and the second vertex.

What is claimed is:

1. A method performed by at least one processor of an encoder, the method comprising:
   performing, on an input 3D mesh, a symmetry detection process to estimate a partition plane;
   partitioning the input 3D mesh into a first side and a second side based on the partition plane, wherein the first side is opposite to the second side, wherein a first vertex on the first side is symmetric to a second vertex on the second side; and
   quantizing the first vertex and the second vertex in pairs to reduce a quantization error and symmetry prediction error associated with the first vertex and the second vertex.

2. The method according to claim 1, wherein the quantization error is based on an error between the first vertex and a quantization of the first vertex.

3. The method according to claim 2, wherein the quantization error is further based on a difference between the second vertex and a quantization of the second vertex.

4. The method according to claim 3, wherein the quantization of the second vertex is determined based on a symmetry prediction performed on the quantized first vertex and the partition plane.

5. The method according to claim 1, wherein the quantizing further comprises performing a search in a 3D space around the quantized first vertex to find a best vertex on the first side and a best vertex on the second side that reduces the quantization error and the symmetry prediction error.

6. The method according to claim 1, wherein the quantizing is performed on K symmetry pairs based on the partition plane, and
   wherein the partition plane is updated based on the quantizing performed on the K symmetry pairs.

7. The method according to claim 6, wherein the quantizing performed on the K symmetry pairs and the updating of the partition plane is iteratively performed until a change in the partition plane between a first iteration and a second iteration is less than a threshold.

8. The method according to claim 1, further comprising:
   determining, based on an a 2D matching process performed on the input 3D mesh that is partitioned, a 2D mesh;
   segmenting the 2D mesh into a plurality of non-connected segments;
   performing, for at least one non-connected segment in the plurality of non-connected segments, a symmetry detection process to determine a transform that partitions the at least one non-connected segment into a first side and a second side opposite to the first side, wherein the first side includes a first 2D vertex and the second side include a second 2D vertex symmetric to the first 2D vertex; and
   quantizing the first 2D vertex and the second 2D vertex in pairs to reduce a quantization error associated with the first 2D vertex and a symmetry prediction error associated with the second 2D vertex.

9. The method according to claim 8, wherein the quantization error associated with the first 2D vertex is based on an error between the first 2D vertex and a quantization of the first 2D vertex.

10. The method according to claim 9, wherein the quantization error associated with the first 2D vertex is further based on a difference between the second 2D vertex and a quantization of the second 2D vertex.

11. The method according to claim 10, wherein the quantization of the second 2D vertex is determined based on a symmetry prediction performed on the quantized first 2D vertex and the transform.

12. The method according to claim 8, wherein the quantizing the first 2D vertex and the second 2D vertex further comprises performing a search in a 2D space around the quantized first 2D vertex to find a best vertex on the first side of the at least one non-connected segment and a best vertex on the second side of the at least one non-connected segment that reduces the quantization error and the symmetry prediction error.

13. A encoder comprising:
    at least one memory configured to store program code; and
    at least one processor configured to read the program code and operate as instructed by the program code, the program code including:
      performing code configured to cause the at least one processor to perform, on an input 3D mesh, a symmetry detection process to estimate a partition plane,
      partitioning code configured to cause the at least one processor to partition the input 3D mesh into a first side and a second side based on the partition plane, wherein the first side is opposite to the second side, wherein a first vertex on the first side is symmetric to a second vertex on the second side; and
      quantizing code configured to cause the at least one processor to quantize the first vertex and the second vertex in pairs to reduce a quantization error and symmetry prediction error associated with the first vertex and the second vertex.

14. The encoder according to claim 13 wherein the quantization error is based on an error between the first vertex and a quantization of the first vertex.

15. The encoder according to claim 14, wherein the quantization error is further based on a difference between the second vertex and a quantization of the second vertex.

16. The encoder according to claim 15, wherein the quantization of the second vertex is determined based on a symmetry prediction performed on the quantized first vertex and the partition plane.

17. The encoder according to claim 13, wherein the quantizing further comprises performing a search in a 3D space around the quantized first vertex to find a best vertex on the first side and a best vertex on the second side that reduces the quantization error and the symmetry prediction error.

18. The encoder according to claim 13, wherein the quantizing is performed on K symmetry pairs based on the partition plane, and
    wherein the partition plane is updated based on an output of the quantizing performed on the K symmetry pairs.

19. The encoder according to claim 18, wherein the quantizing performed on the K symmetry pairs and the updating of the partition plane is iteratively performed until a change in the partition plane between a first iteration and a second iteration is less than a threshold.

20. A non-transitory computer readable medium having instructions stored therein, which when executed by a processor in an encoder cause the processor to execute a method comprising:

performing, on an input 3D mesh, a symmetry detection process to estimate a partition plane;

partitioning the input 3D mesh into a first side and a second side based on the partition plane, wherein the first side is opposite to the second side, wherein a first vertex on the first side is symmetric to a second vertex on the second side; and quantizing the first vertex and the second vertex in pairs to reduce a quantization error and symmetry prediction error associated with the first vertex and the second vertex.

* * * * *